(12) United States Patent
Iwane

(10) Patent No.: US 7,702,237 B2
(45) Date of Patent: Apr. 20, 2010

(54) OBSERVATION DEVICE, CAMERA AND OBSERVATION METHOD

(75) Inventor: Toru Iwane, Yokohama (JP)

(73) Assignee: Nikon Corporation, Tokyo (JP)

( * ) Notice: Subject to any disclaimer, the term of this patent is extended or adjusted under 35 U.S.C. 154(b) by 819 days.

(21) Appl. No.: 11/481,026

(22) Filed: Jul. 6, 2006

(65) Prior Publication Data

US 2007/0009255 A1   Jan. 11, 2007

(30) Foreign Application Priority Data

Jul. 11, 2005   (JP) ............................. 2005-201309

(51) Int. Cl.
*G03B 17/18*   (2006.01)
*G03B 13/20*   (2006.01)
(52) U.S. Cl. ...................................... 396/287; 396/141
(58) Field of Classification Search ............... 396/141, 396/147, 148, 150, 152, 271, 287, 288, 296, 396/373, 374; 348/333.01, 333.02, 333.09
See application file for complete search history.

(56) References Cited

U.S. PATENT DOCUMENTS

| 5,235,380 A | * | 8/1993 | Yamada et al. ............... 396/289 |
| 5,585,885 A | * | 12/1996 | Muramatsu ................. 396/111 |
| 6,047,139 A | * | 4/2000 | Suda ........................... 396/296 |

FOREIGN PATENT DOCUMENTS

JP    A 06-130481    5/1994

* cited by examiner

*Primary Examiner*—Rodney E Fuller
(74) *Attorney, Agent, or Firm*—Oliff & Berridge, PLC.

(57) ABSTRACT

An observation device capable of observing a first image formed by an objective optical system, includes: a display element into which an illumination light emitted from an illumination source is incident and that generates a second image with the illumination light to superimpose the second image over the first image formed by the objective optical system; a detector that receives the second image to detect information of the second image; and a filter that filters out light of the illumination light advancing to the detector.

21 Claims, 4 Drawing Sheets

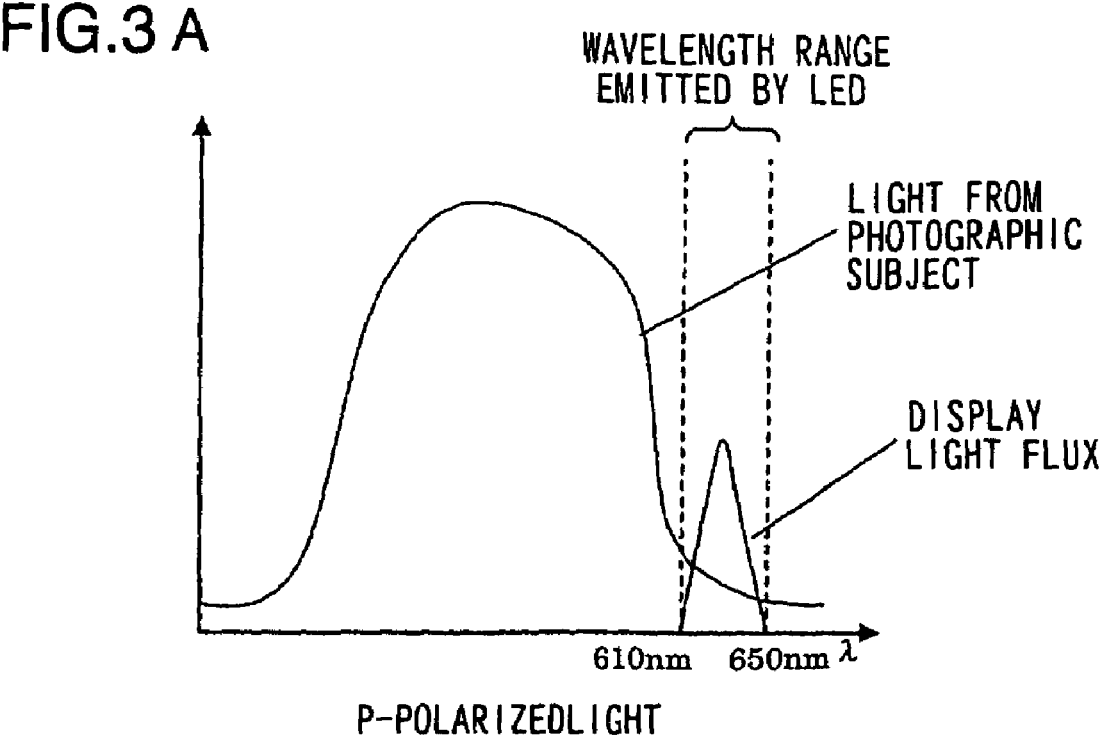
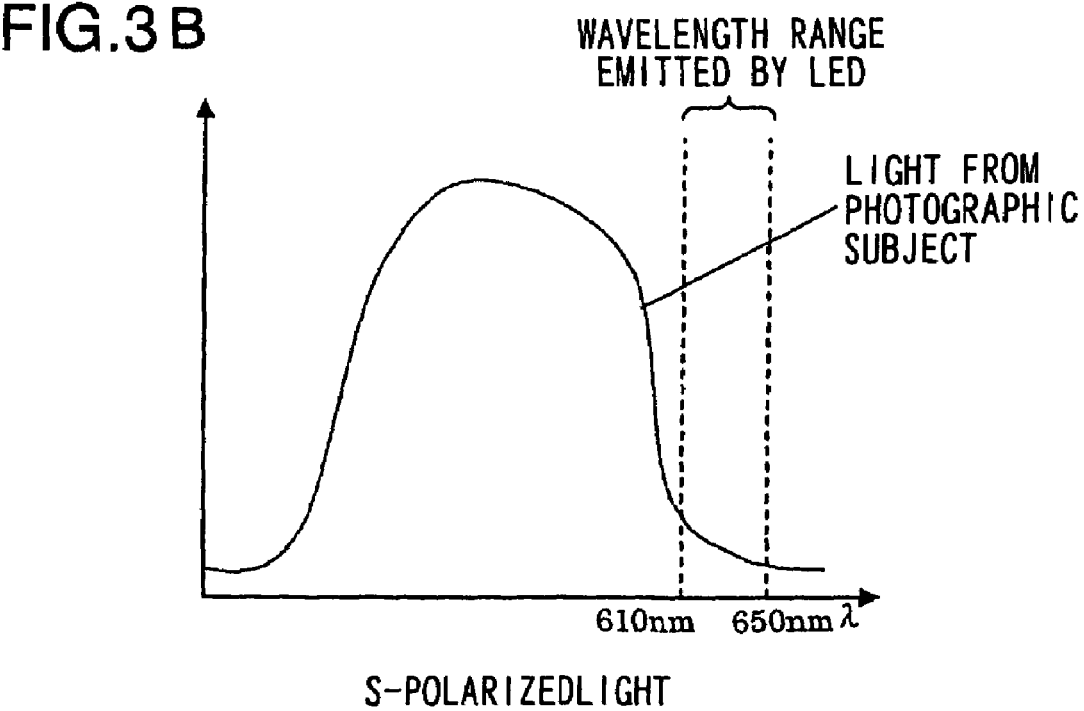

OBSERVATION DEVICE, CAMERA AND OBSERVATION METHOD

INCORPORATION BY REFERENCE

The disclosure of the following priority application is herein incorporated by reference:
Japanese Patent Application No. 2005-201309, filed Jul. 11, 2005

BACKGROUND OF THE INVENTION

1. Field of the Invention

The present invention relates to an observation device and a camera to which such an observation device is provided.

2. Description of Related Art

A device which performs superimposed display of an AF area or the like by superposing it upon an image of an object to be photographed in the field of view of a viewfinder is currently widely employed in digital cameras and silver halide film cameras of the single lens reflex type (for example, refer to Japanese Laid-Open Patent Publication H06-130481). With the display device described in Japanese Laid-Open Patent Publication H06-130481, it is arranged to perform display by projecting illumination light from a LED upon minute prisms which are formed on a focusing glass, and by these prisms conducting the illumination light to an eyepiece lens.

SUMMARY OF THE INVENTION

However, there has been a problem of this display light being incident upon a photometric unit provided in the vicinity, off the optical axis, so that an undesirable influence upon the photometric process is thereby exerted. This type of influence is also generated in the case of a display device which employs a polymer dispersed type liquid crystal display element or a diffraction grating type liquid crystal display element; and, in particular, this influence appears prominently when the display light is bright and the image of the object to be photographed is dark.

According to the 1st aspect of the present invention, an observation device capable of observing a first image formed by an objective optical system, comprises: a display element into which an illumination light emitted from an illumination source is incident and that generates a second image with the illumination light to superimpose the second image over the first image formed by the objective optical system; a detector that receives the second image to detect information of the second image; and a filter that filters out light of the illumination light advancing to the detector.

According to the 2nd aspect of the present invention, in the observation device according to the 1st aspect, it is preferred that the filter is a wavelength selection element to block a wavelength range of the illumination light emitted from the illumination source.

According to the 3rd aspect of the present invention, in the observation device according to the 1st aspect, it is preferred that the filter is a light polarization element to block light having a specific polarized light component of the illumination light.

According to the 4th aspect of the present invention, in the observation device according to the 3rd aspect, it is preferred that there is further provided a polarized light plate that makes the illumination light a specific polarized light.

According to the 5th aspect of the present invention, in the observation device according to the 1st aspect, it is preferred that the display element diffracts a polarized light having a specific wavelength range included in the illumination light to generate the second image.

According to the 6th aspect of the present invention, in the observation device according to the 1st aspect, it is preferred that the detector detects a luminance of the first image formed by the objective optical device.

According to the 7th aspect of the present invention, in the observation device according to the 1st aspect, it is preferred that the illumination source emits the illumination light while the detector is detecting the information of the first image.

According to the 8th aspect of the present invention, in the observation device according to the 5th aspect, it is preferred that the display element comprises a holographic optical element.

According to the 9th aspect of the present invention, in the observation device according to the 1st aspect, it is preferred that the display element comprises a prism.

According to the 10th aspect of the present invention, a camera comprises: an observation optical system capable of observing a first image formed by an objective optical system; an illumination source that emits an illumination light; a display element that is provided in the observation optical system, into which the illumination light emitted from an illumination source is incident, and that generates a second image with the illumination light to superimpose the second image over the first image formed by the objective optical system; a detector that receives the second image to detect information of the second image; and a filter that filters out light of the illumination light advancing to the detector.

According to the 11th aspect of the present invention, in the camera according to the 10th aspect, it is preferred that the filter is a wavelength selection element to block a wavelength range of the illumination light emitted from the illumination source.

According to the 12th aspect of the present invention, in the camera according to the 10th aspect, it is preferred that the filter is a light polarization element to block light having a specific polarized light component of the illumination light.

According to the 13th aspect of the present invention, in the camera according to the 12th aspect, it is preferred that there is further provided a polarized light plate that makes the illumination light a specific polarized light.

According to the 14th aspect of the present invention, in the camera according to the 10th aspect, it is preferred that the display element diffracts a polarized light having a specific wavelength range included in the illumination light to generate the second image.

According to the 15th aspect of the present invention, in the camera according to the 10th aspect, it is preferred that the detector detects a luminance of the first image formed by the objective optical device.

According to the 16th aspect of the present invention, in the camera according to the 10th aspect, it is preferred that the illumination source emits the illumination light while the detector is detecting the information of the first image.

According to the 17th aspect of the present invention, in the camera according to the 14th aspect, it is preferred that the display element comprises a holographic optical element.

According to the 18th aspect of the present invention, in the camera according to the 10th aspect, it is preferred that the display element comprises a prism.

According to the 19th aspect of the present invention, an observation method device observing a first image formed by an objective optical system, comprises: generating a second image with an illumination light emitted from an illumination source; superimposing the generated second image over the first image formed by the objective optical system; receiving the second image to detect information of the second image; and filtering out light of the illumination light advancing to the detector.

According to the 20th aspect of the present invention, in the observation method according to the 19th aspect, it is preferred that the method further comprises making the illumination light a specific polarized light.

According to the 21st aspect of the present invention, in the observation method according to the 19th aspect, it is preferred that the second image is superimposed while the information of the first image is being detected.

BRIEF DESCRIPTION OF THE DRAWINGS

FIG. 3A is a figure showing the spectral distribution of a light flux which arrives at a photometric unit 11, and particularly shows the P-polarized light component thereof;

FIG. 3B is another figure showing the spectral distribution of this light flux which arrives at the photometric unit 11, and particularly shows the S-polarized light component thereof.

DESCRIPTION OF THE PREFERRED EMBODIMENTS

Figure 1:
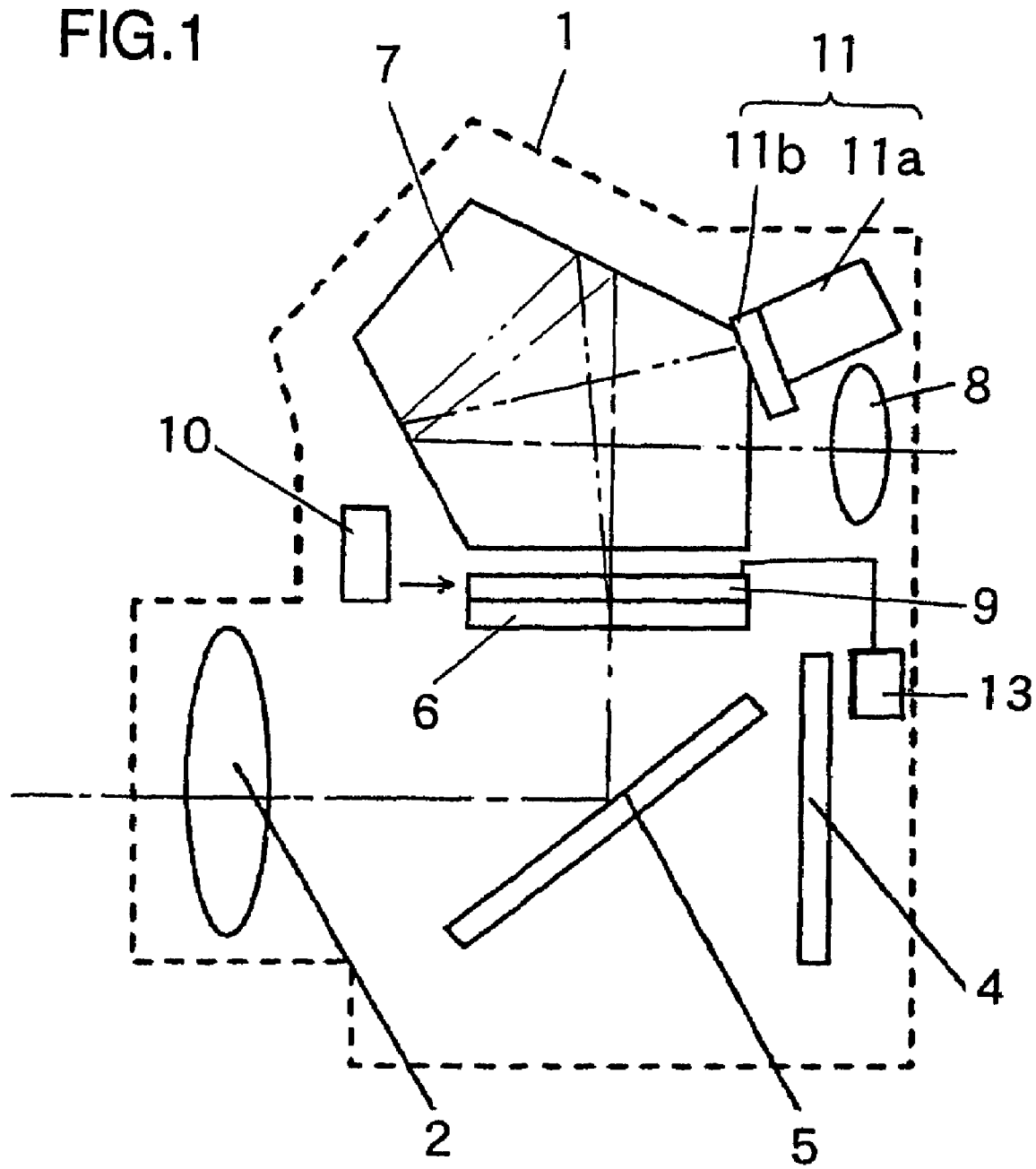
FIG. 1 is a figure showing the schematic structure of an viewfinder of a single lens reflex type camera.

In the following, preferred embodiments for implementing the present invention will be explained with reference to the drawings. FIG. 1 is a figure showing an embodiment of an observation device according to the present invention, and shows the schematic structure of a viewfinder of a single lens reflex camera as the observation device according to the present invention. A lens barrel which comprises a photographic lens 2 is fitted in an exchangeable manner to a camera body 1. Although, in FIG. 1, the example of a single lens reflex camera which uses silver halide film 4 as an image recording medium is shown, in the case of a digital camera of the single lens reflex type, an image sensor such as a CCD or a CMOS element or the like would be used as an image recording medium.

Between the photographic lens 2 and the film 4, there is provided a quick return mirror 5 which reflects light from the object to be photographed in the direction of a pentaprism 7. It should be understood that a shutter is provided between the film 4 and the quick return mirror 5, although this is not shown in the figure. A viewfinder screen 6 is located in a position which is optically equivalent to the photosensitive material surface of the film 4, so that light from the object to be photographed is reflected by the quick return mirror 5 and is imaged upon the viewfinder screen 6.

The image of the object to be photographed which has thus been imaged upon the viewfinder screen 6 may be observed via the pentaprism 7 and the eyepiece lens 8 by a user or a photographer. It should be understood that, during photography, the mirror 5 is shifted away from the optical path of the light from the object to be photographed, so that an image of the object to be photographed is imaged upon the film 4. The photographic lens 2 constitutes an objective optical system that forms the image of the object to be photographed upon the film 4 or upon the viewfinder screen 6.

Furthermore, a diffracting optical element 9 is disposed adjacent to the upper portion of the viewfinder screen 6. Illumination light which has been emitted from an illumination unit 10 is incident into the diffracting optical element 9 from its side surface. As will be described hereinafter, this diffracting optical element 9 is a display member which employs a holographic liquid crystal, and, in this element, there is provided a display section which is endowed with the function of a refractive index type diffraction grating. The illumination light which is incident into the diffracting optical element 9 is diffracted in the direction of the pentaprism 7 by this display section, and is conducted to the eyepiece lens 8. As a result, a marker comes to be displayed by the diffracted light, superimposed over the image of the object to be photographed. This marker which is displayed due to the diffracted light may be a mark, a graphic, a symbol, a numeral or the like related to photographic information such as AF area or the like, or to camera information such as remaining battery amount or the like.

The reference symbol 13 denotes a drive circuit for turning the diffraction function of this diffracting optical element 9 ON and OFF. A photometric unit 11 is provided at the rear of the pentaprism 7, at a position approximately conjugate with the surface of the viewfinder screen above the eyepiece lens 8, so as to look at the surface of the viewfinder screen 6. This photometric unit 11 is for detecting the luminance of the object to be photographed, which is information relating to the object to be photographed, and comprises a photometric sensor 11a and a filter unit 11b which is disposed at the front surface of the photometric sensor 11a. This photometric sensor 11a comprises a plurality of light reception elements corresponding to a plurality of segmented photometric regions which are set within the field of view of the view finder, and performs photometry at various positions of the image of the object to be photographed which has been imaged on the viewfinder screen 6. The result of this photometry is employed for determining an exposure or an aperture for the camera. Sometimes a two dimensional area sensor which has a color filter on its front surface, and which is thus also adapted for performing calorimeter, may also be used as the photometric sensor 11a.

Not only light from the object to be photographed, but also a portion of the light which has been diffracted by the diffracting optical element 9, is incident upon the photometric unit 11. Due to this, it is arranged to block the diffracted light for display from being incident upon the photometric sensor 11a with the filter unit 11b which is disposed on the front surface of the photometric sensor 11a. The position in which this filter member 11b is disposed may be on the front surface of the photometric sensor 11a as shown in FIG. 1; or, alternatively, it may be disposed interior to the photometric sensor 11a, at the front surface of the light reception elements thereof. The function of this filter unit 11b will be described later.

Figure 2:
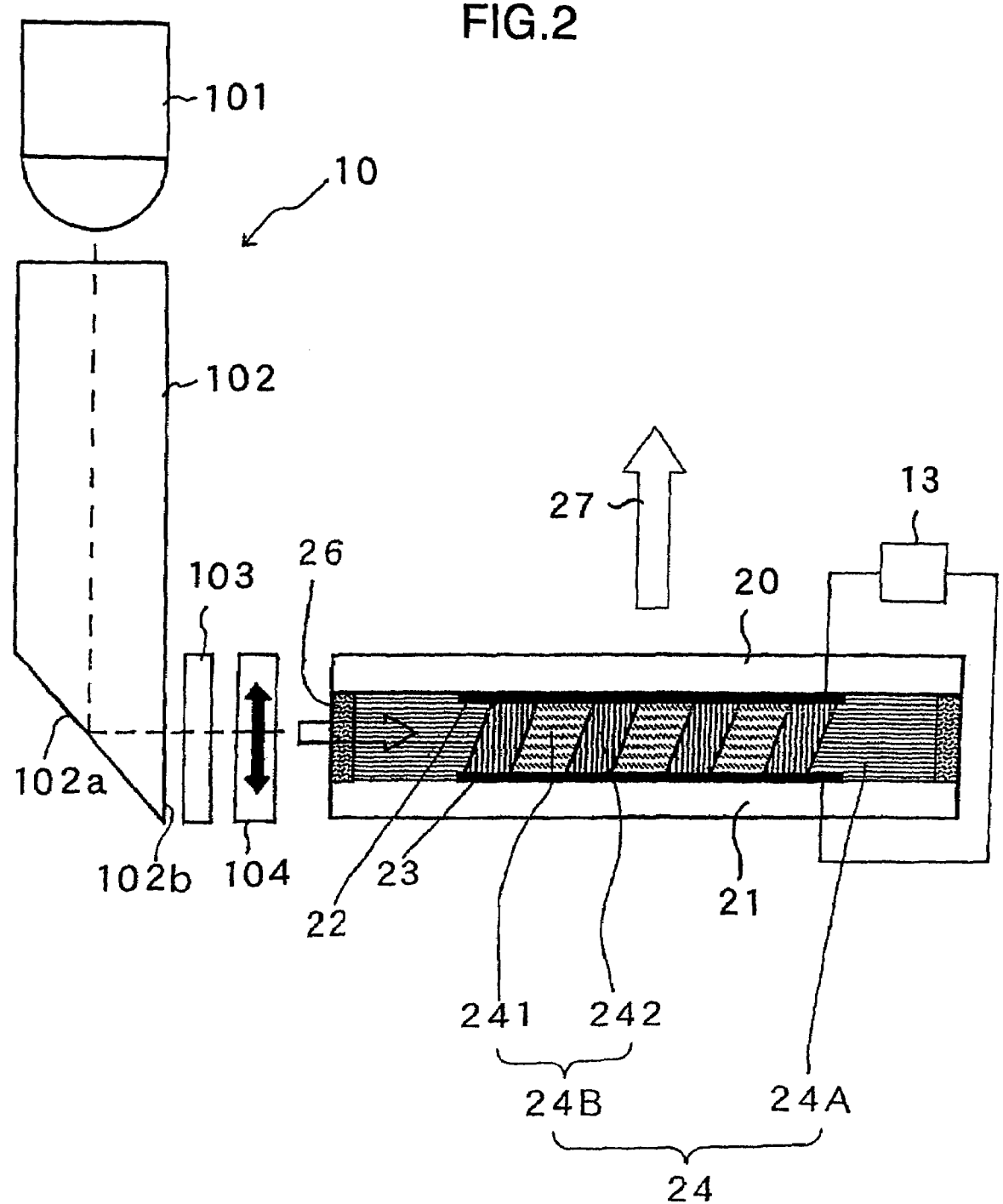
FIG. 2 is a schematic figure showing the structure of a diffracting optical element 9 and an illumination unit 10.

FIG. 2 is a figure schematically showing the structures of the diffracting optical element 9 and the illumination unit 10. First, the diffracting optical element 9 will be explained. This diffracting optical element 9 comprises a pair of glass substrates 20, 21, and transparent electrodes 22, 23 are respectively formed on mutually confronting surfaces of these glass substrates 20, 21. These transparent electrodes 22, 23 are formed of the same shape, and have a shape according to the display format of the display section. The transparent electrodes 22, 23 are connected to the above described drive circuit 13, and the turning ON and OFF of an applied voltage to the transparent electrodes 22, 23 is controlled by the drive circuit 13.

A mass of liquid crystal 24 is provided between the glass substrates 20, 21 provided with the transparent electrodes 22, 23, and is sealed in by a seal member 26 which is arranged around the peripheral portions of the glass substrates 20, 21.

This liquid crystal mass 24 consists of a non-display section 24A in the portion where the transparent electrodes 22, 23 are not provided, and a display section 24B which is sandwiched between the transparent electrodes 22, 23. In the non-display section 24A, a macromolecular material which is isotropic with regard to refractive index and a material (liquid crystal) which is anisotropic with regard to refractive index are in a state of being mixed together in a non-hardened state.

On the other hand the display section 24B is a section which constitutes a liquid crystal hologram, and it has a banded multi-layered structure in which isotropic refractive index layer regions 241 and anisotropic refractive index layer regions 242 are alternatingly repeated in the direction along the surface of the in-viewfinder display element 9, in other words in the direction of progression of the illumination light. The isotropic refractive index layer regions 241 are regions in which the above described macromolecular molecule is hardened and has become a polymer, while, in the anisotropic refractive index layer regions 242, a large number of small droplets of the liquid crystal, which is the material with an anisotropic refractive index, are included in this hardened macromolecular polymer.

The isotropic refractive index layer regions 241 which are made from polymer have isotropic refractive index, irrespective of whether or not any voltage is being applied to the transparent electrodes 22, 23. On the other hand, in the anisotropic refractive index layer regions 242, the orientation of the liquid crystal changes according to whether or not voltage is being applied to the transparent electrodes 22, 23, and along with this, their refractive index also changes.

In the state in which no voltage is being applied to the transparent electrodes 22, 23, with regard to light which is incident along the lamination direction of the display section 24B, such as the illumination light which is emitted from the illumination unit 10, it is arranged for the refractive index of the liquid crystal and the refractive index of the polymer to have mutually different refractive index values, so as to satisfy the Bragg diffraction condition. In other words, in the state in which no voltage is applied, the display section 24B is constituted by a refractive index type diffraction grating, in which layers in which the refractive index is large and layers in which the refractive index is small are arranged alternatingly in series. The diffraction condition at this time is set so that the illumination light is diffracted in the direction of the pentaprism 7 (refer to FIG. 1). As a result, the diffracted light 27 is emitted from the diffracting optical element 9 in the upwards direction as seen in the figure.

On the other hand, in the state in which a voltage is applied, along with the orientation of the liquid crystal in the anisotropic refractive index layer region 242 changing, the refractive index also changes, and the refractive index of the liquid crystal and the refractive index of the polymer for the illumination light, which is proceeding in the lamination direction, become equal. As a result, the incident illumination light is not diffracted, but rather passes through the display section 24B.

The illumination unit 10 comprises a light source LED 101, a light guide 102, a diffusion plate 103, and a polarized light plate 104. The light source LED 101 emits, for example, substantially monochromatic light of half width 15 nm centered on a wavelength of $\lambda=630$ nm, and the light flux (luminous flux) which is emitted is incident into the light guide 102. The light guide 102 is made from a transparent plastic material, with a reflecting surface 102a being formed by vapor deposition at a lower sloping surface thereof, and with a light flux emission surface 102b being formed in the neighborhood thereof. The illumination light which is incident into this light guide 102 progresses through the interior of the light guide 102, and is reflected off from the reflection surface 102a and emitted from the light flux emission surface 102b.

The illumination light which has been emitted from the light flux emission surface 102b of the light guide 102 is incident upon the diffusion plate 103. This diffusion plate 103 is a one dimensional diffusion plate which only has a diffusion effect in the longitudinal direction of the diffracting optical element 9 (the direction perpendicular to the drawing paper), and the illumination light is thereby spread out so as to arrive at all the regions of the diffracting optical element 9. The polarized light plate 104 passes only P-polarized light whose direction of light polarization coincides with the substrate thickness direction of the diffracting optical element 9, while light which is polarized in any other manner is absorbed. In other words, only the P-polarized light in the illumination light generated by the light source LED 101 is incident upon the diffracting optical element 9.

The display section 24B which is formed within the diffracting optical element 9 diffracts only this P-polarized light, while it only scatters light of other polarizations, but does not operate as a diffraction grating therefor. Due to this, by absorbing the light of other than P-polarization with the polarized light plate 104, it is possible to reduce the component which is scattered by the display section 24B, so that thereby it is possible to anticipate an enhancement of the contrast of the display. The diffracted light which is emitted from the diffracting optical element 9 thus becomes P-polarized light, and its wavelength is of narrow bandwidth, since its light source is a LED. For example, if a light source LED 101 of wavelength 630 nm is used, then the display light may be considered as being P-polarized light having a wavelength of from 610 nm to 650 nm.

As a result, P-polarized display light is included in the light flux which arrives at the photometric unit 11, in addition to the light from the object to be photographed which is the background light of the display. FIGS. 3A and 3B are figures showing the spectral distribution of the light flux which arrives at the photometric unit 11: FIG. 3A shows the P-polarized light component, while FIG. 3B shows the S-polarized light component. The distribution curve which appears highest in the vicinity of the center of FIGS. 3A and 3B is a curve due to the light from the object to be photographed, while the distribution curve in FIG. 3A which has a peak in the long wavelength region shows the display light flux which has been diffracted by the diffracting optical element 9. Since, as described above, the display light flux includes only the P-polarized light component, it does not appear in FIG. 3B which shows the S-polarized light component. Furthermore since, as described above, the display light is illumination light of the light source LED 101 which has been diffracted, accordingly its wavelength region is included within the range of the LED light emission wavelength (610 nm$<\lambda<$650 nm).

In this embodiment, the filter unit 11b is disposed on the front surface of the photometric sensor 11a, so that P-polarized light in the wavelength region of 610 nm to 650 nm is blocked from being incident upon the photometric sensor 11a. It should be understood that the P-polarized light component having the same wavelength region with regard to light other than the display light is also blocked. As a result, it is possible for the photometric sensor 11a to perform photometry without experiencing any influence from the display light. As the functional member which is used for the filter unit 11b for eliminating P-polarized light of the specified wavelength region in this manner, there may be used a holographic filter which diffracts P-polarized light of the specified wavelength region, or a wavelength-selective PBS which is obtained by making a multi-layered thin film. In either case, its function as the polarized light element of the filter unit 11b is to pass only the S-polarized light whose light polarization direction is perpendicular with respect to the light polarization direction of the display light.

It should be understood that although, in the above described embodiment, the polarized light plate 104 was provided to the illumination unit 10, so that the illumination light incident upon the diffracting optical element 9 was made to be only P-polarized light, because, principally, the light which is diffracted by the display section 24B is only P-polarized light, accordingly the polarized light plate 104 may be omitted, since it is not absolutely necessary to provide it.

A Variant Embodiment

The present invention is not limited only to a display device of the diffraction grating type, as described above; it may also be applied, in the same manner, to a LED projection type display device. In the prior art, in a LED projection type display device, in order to avoid any influence of the display light upon photometry, it was arranged to display instantaneous illumination at a timing at which the photometric function did not operate. However, it is desirable for an in-viewfinder marker such as an AF area marker to be always turned on, and, by applying the present invention, it also becomes possible always to turn on an LED projection type display device.

Figure 4:
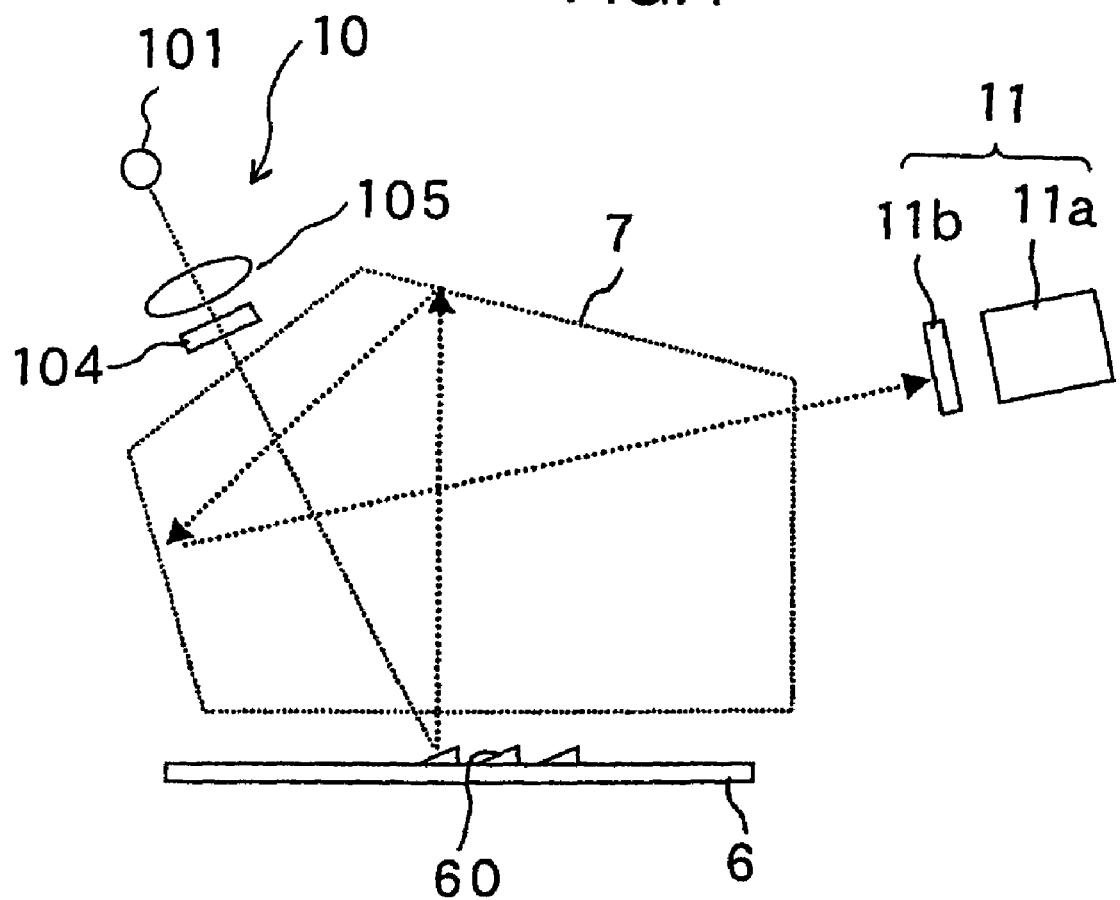
FIG. 4 is a figure showing the schematic structure when applying the present invention to a LED projection method display device.

FIG. 4 is a figure showing the schematic structure in the case of an LED projection method; in this figure, to structural elements the same as ones in FIG. 1, the same reference symbols are appended. A plurality of micro prisms 60 for display are formed on a viewfinder screen 6. An illumination unit 10 is provided above a pentaprism 7, and its illumination light passes through the pentaprism 7 and is projected upon the micro prisms 60. A light source LED 101, a collimator lens 105, and a polarized light plate 104 are provided to the illumination unit 10. It should be understood that although, in FIG. 4, only one illumination unit 10 is shown, there may be provided a plurality of illumination units 10, corresponding to the number of markers. In this case, the direction of light polarization of the polarized light plate 104 which is provided to each of the illumination units 10 are all made to be the same direction, so that P-polarized light is emitted from each of the polarized light plates 104.

The P-polarized illumination light which has been emitted from the illumination unit 10 is projected upon the micro prisms 60, and is reflected in the direction of the pentaprism 7 by the sloping surfaces of the micro prisms 60. The light which is reflected by the plurality of micro prisms 60, in other words the display light, is observed as a marker via the pentaprism 7 and an eyepiece lens 8.

Since the illumination light which is projected from the illumination unit 10 is not perfectly collimated, at this time, the display light also arrives at a photometric unit 11 which is disposed so as to look at the viewfinder screen 6 which is in the vicinity, off the optical axis. However, since the filter member 11b which is disposed on the front surface of the photometric sensor 11a is a wavelength selection type polarized light member, and its light polarization direction is set to be perpendicular with respect to the light polarization direction of the display light, accordingly most of the display light is intercepted by this filter member 11b. As a result, it is possible to perform photometry while experiencing almost no influence from the display light.

The orientation of the side surfaces (reflection surfaces) of the micro prisms 60 shown in FIG. 4 is generally a gentle slope in the leftward direction as seen in the figure, but a plurality of micro prisms 60 are also disposed in the direction perpendicular to the drawing paper, so as to correspond to the display shape. And the surface directions of the micro prisms 60 are set so as to return the light flux which each of them reflects back in the field of view direction. Due to this, the reflection surface of each of the micro prisms 60 is given a slight angle in the direction perpendicular to the drawing paper, so that, when illumination light whose light polarization direction is in the direction perpendicular to the drawing paper is incident upon this type of reflection surface, the plane of light polarization is rotated, but only slightly.

By an amount thereof corresponding to this rotational angle getting past the blocking function of the filter unit 11b which is provided to the photometric unit 10, a portion of the display light which is incident upon the filter unit 11b passes through the filter unit 11b and comes to be incident upon the photometric sensor 11a. Since there is no problem in practice if around 90% of the disturbance light (the display light) which has become incident upon the photometric unit 11 in this manner is eliminated, accordingly it becomes possible to operate with no problem at all if, as described above, the direction of light polarization of the polarized light plates 104 is set to the direction perpendicular to the drawing paper, or to the left and right direction.

The above described embodiments are examples, and various modifications can be made without departing from the spirit and scope of the invention.

What is claimed is:

1. An observation device capable of observing a first image formed by an objective optical system, comprising:
    a display element into which an illumination light emitted from an illumination source is incident and that generates a second image with the illumination light to superimpose the second image over the first image formed by the objective optical system;
    a detector that receives the first image to detect information of the first image; and
    a filter that filters out light of the second image from the display element advancing to the detector.

2. An observation device according to claim 1, wherein the filter is a wavelength selection element to block a wavelength range of the illumination light emitted from the illumination source.

3. An observation device according to claim 1, wherein the filter is a light polarization element to block light having a specific polarized light component of the illumination light.

4. An observation device according to claim 3, further comprising:
    a polarized light plate that makes the illumination light a specific polarized light.

5. An observation device according to claim 1, wherein the display element diffracts a polarized light having a specific wavelength range included in the illumination light to generate the second image.

6. An observation device according to claim 5, wherein the display element comprises a holographic optical element.

7. An observation device according to claim 1, wherein the detector detects a luminance of the first image formed by the objective optical device.

8. An observation device according to claim 1, wherein the illumination source emits the illumination light while the detector is detecting the information of the first image.

9. An observation device according to claim 1, wherein the display element comprises a prism.

10. A camera, comprising:
   an observation optical system capable of observing a first image formed by an objective optical system;
   an illumination source that emits an illumination light;
   a display element that is provided in the observation optical system, into which the illumination light emitted from an illumination source is incident, and that generates a second image with the illumination light to superimpose the second image over the first image formed by the objective optical system;
   a detector that receives the first image to detect information of the first image; and
   a filter that filters out light of the second image from the display element advancing to the detector.

11. A camera according to claim 10, wherein the filter is a wavelength selection element to block a wavelength range of the illumination light emitted from the illumination source.

12. A camera according to claim 10, wherein the filter is a light polarization element to block light having a specific polarized light component of the illumination light.

13. A camera according to claim 12, further comprising:
   a polarized light plate that makes the illumination light a specific polarized light.

14. A camera according to claim 10, wherein the display element diffracts a polarized light having a specific wavelength range included in the illumination light to generate the second image.

15. A camera according to claim 14, wherein the display element comprises a holographic optical element.

16. A camera according to claim 10, wherein the detector detects a luminance of the first image formed by the objective optical device.

17. A camera according to claim 10, wherein the illumination source emits the illumination light while the detector is detecting the information of the first image.

18. A camera according to claim 10, wherein the display element comprises a prism.

19. An observation method device observing a first image formed by an objective optical system, comprising:
   generating a second image with an illumination light emitted from an illumination source;
   superimposing the generated second image over the first image formed by the objective optical system;
   receiving the first image to detect information of the first image; and
   filtering out light of the second image advancing to the detector.

20. An observation method according to claim 19, further comprising:
   making the illumination light a specific polarized light.

21. An observation method according to claim 19, wherein the second image is superimposed while the information of the first image is being detected.

* * * * *